United States Patent
Hasan et al.

(10) Patent No.: US 8,326,892 B2
(45) Date of Patent: Dec. 4, 2012

(54) METHODS AND SYSTEMS FOR AUTOMATIC CONVERSION OF A UTILITY MONITORING SYSTEM LAYOUT INTO A STORAGE FORMAT

(75) Inventors: Amjad Hasan, Murfreesboro, TN (US); Ronald W. Carter, Murfreesboro, TN (US); Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 542 days.

(21) Appl. No.: 12/156,173

(22) Filed: May 30, 2008

(65) Prior Publication Data

US 2009/0300034 A1    Dec. 3, 2009

(51) Int. Cl.
*G06F 7/00*    (2006.01)
*G06F 17/30*    (2006.01)

(52) U.S. Cl. ........................................ 707/811
(58) Field of Classification Search .................. 707/811, 707/999.101
See application file for complete search history.

(56) References Cited

U.S. PATENT DOCUMENTS

| | | | | |
|---|---|---|---|---|
| 6,516,326 | B1 * | 2/2003 | Goodrich et al. | 707/602 |
| 6,732,019 | B2 * | 5/2004 | Spool et al. | 700/291 |
| 6,988,025 | B2 * | 1/2006 | Ransom et al. | 700/295 |
| 7,272,518 | B2 | 9/2007 | Bickel et al. | |
| 2006/0238364 | A1 * | 10/2006 | Keefe et al. | 340/646 |
| 2007/0005277 | A1 * | 1/2007 | Bickel et al. | 702/61 |

FOREIGN PATENT DOCUMENTS

WO    WO 2007/032944    3/2007

OTHER PUBLICATIONS

Written Opinion corresponding to co-pending International Patent Application Serial No. PCT/US2009/045364, European Patent Office; dated Mar. 26, 2010; (6 pages).
International Search Report corresponding to co-pending International Patent Application Serial No. PCT/US2009/045364, European Patent Office; dated Mar. 26, 2010; (4 pages).
Paukatong T et al.: "From real-time data to a power network display: An EGAT-SCADA's conceptual design"; dated 2005; (7 pages).

* cited by examiner

*Primary Examiner* — Aleksandr Kerzhner
(74) *Attorney, Agent, or Firm* — Nixon Peabody LLP (57) ABSTRACT

A method and system of converting numerical infrastructure data relating to a utility monitoring system having elements arranged in a hierarchy to a graphic compatible storage data format. Numerical infrastructure data relating to the elements of the utility monitoring system is obtained. The numerical infrastructure data relating to the elements of the utility monitoring system is converted to the graphic compatible storage data format. The graphic compatible storage data format may be System Specification Description (SSD). The converted data is stored in a storage file. A user interface may access the storage file to generate a graphic display showing the elements of the utility monitoring system arranged in the hierarchy.

18 Claims, 9 Drawing Sheets

METHODS AND SYSTEMS FOR AUTOMATIC CONVERSION OF A UTILITY MONITORING SYSTEM LAYOUT INTO A STORAGE FORMAT

FIELD OF THE INVENTION

The present invention relates generally to utility systems, and, in particular, to automated conversion of hierarchy data into a storage format that can be used to present a graphical representation of the hierarchical layout of a utility monitoring system.

BACKGROUND OF THE INVENTION

Recently, methods and systems have been proposed to automatically learn a hierarchy of a utility monitoring system based on monitored data. An example of such methods and systems may be found in U.S. Pat. No. 7,272,518. Data representative of the hierarchy is stored in a numerical format that is not a form that is readily understandable to end-users. For example, the numerical data indicates how devices and components in the utility system are interconnected, but if presented directly to the end-user, the hierarchy would be difficult to visualize. In order to provide useful layouts, a user still must graph or map out the devices in the hierarchy in a graphical format from raw data.

What is needed, therefore, is an automated conversion of system layout data to a storage format that can be directly transformed into a graphical representation of the hierarchical layout of a utility system using graphical presentation software. Aspects of the present invention are directed to satisfying these and other needs.

SUMMARY OF THE INVENTION

Aspects herein propose an automatic conversion of numerical infrastructure data indicative of a hierarchical layout of a utility system being monitored into a storage format that enforces a custom set of rules and parameters for ensuring a consistent set of elements and attributes that can be presented directly to a graphical presentation software, which converts the formatted data into a graphical representation output of the hierarchical layout. The numerical data representing the hierarchy may not be presented directly to a graphical presentation software application, and therefore needs to be formatted into a storage format that can be recognized and interpreted by the graphical presentation software. XML or System Specification Description (SSD) formatted data is preferable because the programmer can define custom XML or ssd elements with custom attributes to format common data elements consistently according to their attributes. This eliminates the need to run the hierarchy learning algorithm each time a graphical representation is required because the storage format may be directly accessed.

Heretofore, hierarchy has been presented from a numerical perspective. This invention allows us to convert the numerical hierarchy data into a graphical format that significantly simplifies configuration, analysis and decision making for the end-user. For obvious reasons, the graphical format is critical for a "typical" end-user to have a visual context of their utility monitoring system. This invention allows the end-user to modify the hierarchy graphically and provides a means to validate those modifications accordingly. This invention also allows the end-user to add, modify and delete infrastructure components, characteristics and parameters.

Briefly, one example is a method of converting numerical infrastructure data relating to a utility monitoring system having elements arranged in a hierarchy to a graphic compatible storage data format. Numerical infrastructure data relating to the elements of the utility monitoring system is obtained. The numerical infrastructure data relating to the elements of the utility monitoring system is converted to the graphic compatible storage data format. The converted data is stored in a storage file.

Another example is a system converting numerical infrastructure data to graphic compatible storage data format. The system includes a data interface that obtains numerical infrastructure data relating to the elements of a utility monitoring system. The elements of the utility monitoring system are arranged in a hierarchy. A controller converts the numerical infrastructure data relating to the elements of the utility monitoring system to the graphic compatible storage data format. The controller stores the converted data in a storage file. A storage device is coupled to the controller to store the storage file.

Another example is a machine readable medium having stored thereon instructions for converting numerical infrastructure data relating to a utility monitoring system having elements arranged in a hierarchy to a graphic compatible storage data format. The stored instructions include machine executable code, which when executed by at least one machine processor, causes the machine to obtain numerical infrastructure data relating to the elements of the utility monitoring system. The stored instructions cause the machine to convert the numerical infrastructure data relating to the elements of the utility monitoring system to the graphic compatible storage data format. The stored instructions cause the machine to store the converted data in a storage file.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
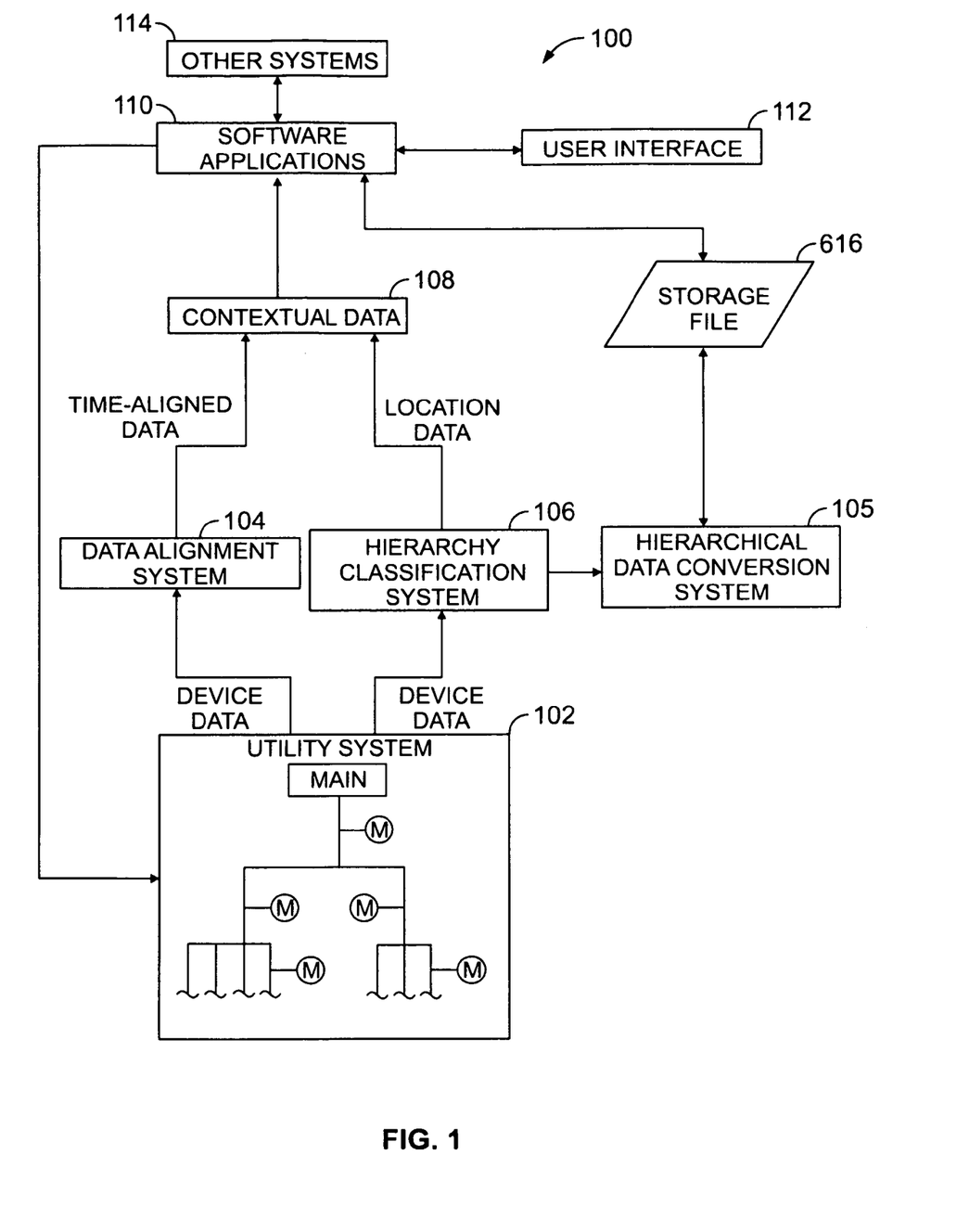
FIG. 1 is functional block diagram of an automated data integration monitoring system that automatically converts numerical infrastructure data to data in a storage data format in a hierarchical data conversion system.

Turning now to FIG. 1, an automated data integrated monitoring system 100 is generally shown. A utility system 102 having multiple monitoring devices (also may be referred to herein as intelligent electronic devices or IEDs) M receives data from each monitoring device M that is communicated to an automated data alignment system 104 and to an automated hierarchy classification system 106. The data is aligned automatically in the automated data alignment system 104 and produces data that is aligned such that it represents the data when it was actually seen simultaneously by the monitoring devices M in the utility system 102. The hierarchy classification system 106 automatically learns the hierarchy of monitoring devices present in the utility system 102 and their relationships relative to one another.

Once the data from each monitoring device M is aligned and each monitoring device's location is known, the data is said to be in context 108. The contextual data 108 can be used by software applications 110 to provide and diagnose useful information about the utility system 102 beyond what is generally available if the data is not in context. The utility being monitored in the utility system 102 can be any of the five utilities designated by the acronym, WAGES, or water, air, gas, electricity, or steam. Each monitoring device or IED measures characteristics of the utility, and quantifies these characteristics into data that can be analyzed by a computer.

A user interacts with the software applications 110 via a conventional user interface 112. Hierarchical data in the form of numerical utility infrastructure data produced by the hierarchy classification system 106 is provided to a hierarchical data conversion system 105. As will be explained below, the hierarchical data conversion system 105 converts the numerical infrastructure data into a storage file format that may be used by software applications 110 to present the hierarchy of the utility system 102 in a graphical format. The formatted hierarchical data is stored in a storage file 616, described below in more detail in connection with FIG. 6. The software applications 110 generally run on a computer with a controller or processor with a storage device that will be described below.

The hierarchical data conversion system 105 may include a modification module that may be accessed by the controller to modify the storage file 616 in accordance with an element that was modified in, added to, or removed from the utility system 102. The hierarchical data conversion system 105 may further include a verification module accessed by the controller to validate the modification against predetermined criteria. The software applications 110 can be linked to other systems 114, such as a billing system, and use the contextual data 108 to communicate messages between the other systems 114 and the user interface 112. The user interface 112 may include a display to present a graphic representing the system layout generated from the data in the storage format.

The data alignment system 104 aligns data, such as voltage, current, time, events, and the like, from multiple monitoring devices M in a utility system, and is a valuable tool for users. When data from all the monitoring devices M is aligned to the same point in time that the data occurred, the data can be put into a temporal context from which additional decisions regarding hardware and software configuration can be automatically made or recommended. An exemplary data alignment system 104 is further described in U.S. Pat. No. 7,272,518, hereby incorporated by reference. As used herein, a monitoring device or IED refers to any system element or apparatus with the ability to sample, collect, or measure one or more operational characteristics or parameters of a utility system 102. When the utility system 102 is a utility monitoring system, the monitoring device M can be a utility meter or circuit monitor that measures electrical characteristics or parameters of the utility monitoring system. For example, the monitoring device may be based on a PowerLogic® Series 3000/4000 Circuit Monitor or a PowerLogic® ION7550/7650 Power and Energy Meter available from Schneider Electric or any other suitable IED.

Figure 2:
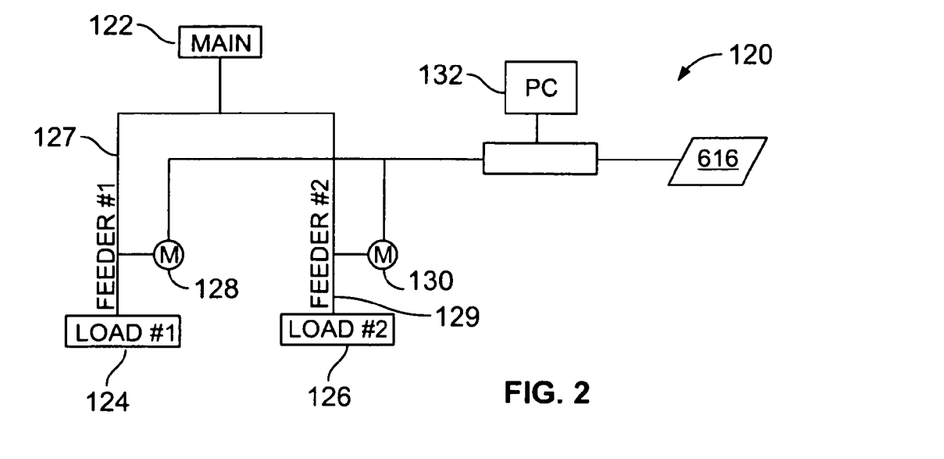
FIG. 2 is a functional block diagram of a simplified utility monitoring system including a personal computer having access to a storage file containing a data representation of the hierarchical layout of the utility monitoring system.

A simplified configuration of a utility monitoring system 120 is shown in FIG. 2. The utility monitoring system 120 includes a main 122 connected to a first load 124 by a first feeder 127 and to a second load 126 by a second feeder 129. Monitoring devices 128, 130 measure electrical characteristics or parameters associated with the first and second feeders 127 and 129, respectively. Each monitoring device 128, 130 is communicatively coupled to a computer 132, which access the storage file 616.

Figure 3:
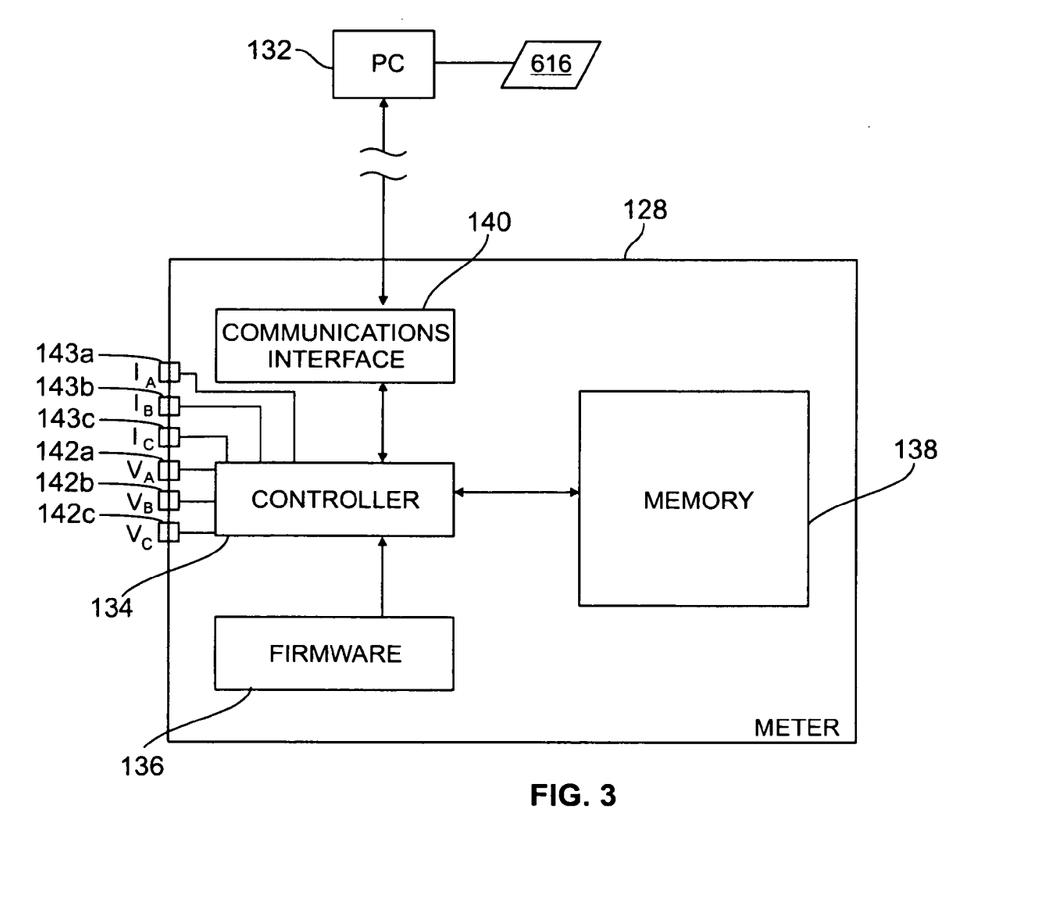
FIG. 3 is a functional block diagram of a monitoring device in accordance with the system in FIG. 1.
Figure 4:
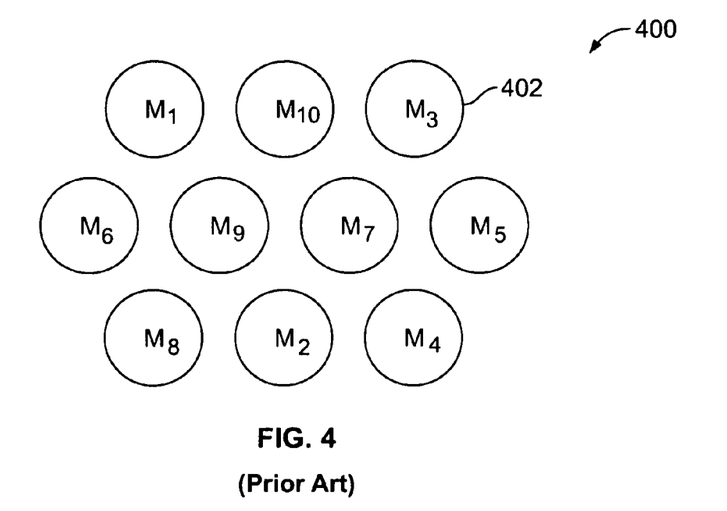
FIG. 4 is a diagram of a non-contextualized layout of monitoring devices according to prior-art utility monitoring systems.

The first monitoring device 128 can be a utility meter or a circuit monitor, such as shown in FIG. 3. The monitoring device 128 includes a controller 134, firmware 136, memory 138, a communications interface 140, and three phase voltage conductor connectors 142$a,b,c$, which connect to the $V_A$, $V_B$, and $V_C$ phase voltage conductors, respectively, and are coupled to the controller 134. Three phase current conductor connectors 143$a,b,c$, which connect to the $I_A$, $I_B$, and $I_C$ phase current conductors, respectively, are coupled to the controller 134. The firmware 136 includes machine instructions for directing the controller to carry out operations required for the monitoring device. Memory 138 is used by the controller 134 to store electrical parameter data measured by the monitoring device 128.

Instructions from the computer 132 are received by the monitoring device 128 via the communications interface 140. Those instructions include instructions that direct the controller 134 to mark the cycle count, to begin storing electrical parameter data, or to transmit to the monitoring system software 132 electrical parameter data stored in the memory 138. The electrical parameter data can include any data acquired by monitoring devices, including any combination of frequency variations, amplitude variations, and phase variations. The computer 132 also accesses the storage file 616 to output a graphical representation of the utility monitoring system hierarchy to the end-user.

Referring back to FIG. 1, the integrated monitoring system 100 includes the hierarchy classification system 106. Having a thorough knowledge of a utility system's layout is essential to understanding and characterizing the system. Utility meters typically provide only the utility system's operating parameters, but do not give information on how the parameters at different points on the utility system relate to each other. Having the hierarchy of a utility system puts the operating parameters of multiple meters into context with each other. This context gives the user a more powerful tool to: troubleshoot system problems, improve system efficiencies, predict failures and degradation, locate the source of disturbances, and model system responses.

As will be explained below, the hierarchical data conversion system 105 receives a numerical representation of the utility monitoring system hierarchy, formats the numerical data according to one of various types of storage formats, and stores the formatted data in the storage file 616 for presentation to presentation software that converts the formatted data into a graphical representation of the hierarchy for output to the end-user. The ability to graphically represent the hierarchy provides the end-user with a distinctive perspective and context of the utility monitoring system that allows them to more quickly resolve the aforementioned issues. U.S. Pat. No. 7,272,518, hereby incorporated by reference, and PCT Patent Application No. PCT/US2006/034394, titled "Improvements in Hierarchy Determination for Power Monitoring Systems," filed Nov. 5, 2007 [SPL-0099], have described in detail methods of automatically determining a utility monitoring system's hierarchy from data gathered from monitoring devices such as the meter 128 in FIG. 3 throughout the monitoring system 100 in FIG. 1. This numerical data output representative of the auto-learned hierarchy is converted from an auto-learned hierarchy algorithm in the hierarchy classification system 106 into a storage file format by the hierarchical data conversion system 105, which can then be used to graphically present a graphical representation of the hierarchy to the user via the user interface 112 in this example.

The hierarchy classification system 106 of the present invention allows the monitoring system software to collect data from the monitoring device on the utility system 102, and automatically determine the hierarchy of the utility system 102 with little or no user input. The level of detail given by the hierarchy classification system 106 directly correlates with the number and extent of monitoring devices in the utility system 102. As supplemental monitoring devices are added, the auto-learned hierarchical algorithm enables them to be automatically incorporated into the determined hierarchical structure.

A hierarchy of nodes is based on a relationship that determines that one node is always greater than another node, when the nodes are related. A hierarchy's relationship can link or interrelate elements in one of three ways: directly, indirectly, or not at all. An illustration of a direct link or interrelationship is shown in FIG. 2 between the Load$_2$ 126 and Feeder$_2$ 129. In contrast, an indirect link exists between Load$_2$ 126 and Main$_1$ 122. Finally, there is effectively no link between the Load$_1$ 124 and Load$_2$ 126 and between Feeder$_1$ 127 and Feeder$_2$ 129.

Generally, the hierarchy classification system 106 utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by monitoring device M). Multiple samples of specified parameters are taken from each meter in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is presented to the user for concurrence. As each monitoring device's data is evaluated over time (the learning period) with respect to all other monitoring devices using the auto-learned hierarchy algorithm, a basic layout of the hierarchical structure of the utility system 102 is determined based on the monitoring points available. In this respect, the algorithm uses historical trends of the data from each monitoring device, and those trends are compared to determine whether any interrelationship (link) exists between the monitoring devices. A more detailed hierarchical structure can be determined with more monitoring points available for analysis. The layout of the hierarchy is stored in the form of numerical utility infrastructure data.

In an embodiment in which the utility system 102 is a utility monitoring system, samples of specific electrical parameters (such as power, voltage, current, or the like) are simultaneously taken from each monitoring device in the utility monitoring system. This parameter data is stored and analyzed with respect to the time the sample is taken, the associated value of the data point, and the monitoring device providing the data.

One or more rules or assumptions are used to determine the hierarchical order of the utility system. Certain assumptions may have to be made about the utility system in order to auto-learn the utility system's hierarchy. The assumptions are based on Ohm's Law, conservation of energy, conservation of mass, and working experience with typical utility distribution and utility monitoring systems.

General rules may be made by the auto-learned hierarchy algorithm in connection with utility systems and utility monitoring systems. Additional parameters may be present for the auto-learned hierarchy algorithm as well. Assumptions and parameters can be combined for a radial-fed or non-radial fed electrical utility system. The numerical infrastructure data representative of the hierarchy from the auto-learned hierarchy algorithm is converted by the hierarchy data conversion system 105 to a data storage format that may allow the layouts to be outputted graphically that in turn illustrates the hierarchy in a visual context to the end-user. A visually contextual representation(s) of the hierarchy of a utility monitoring system is an integral part of providing that end-user with key information in a timely and meaningful manner.

The automatic conversion algorithm in the hierarchical data conversion system 105 described below automatically converts utility monitoring system hierarchical data in the format of numerical infrastructure data such as that obtained by the hierarchy classification system 106 into one of several types of storage formats including but not limited to extensible markup language (XML), Database format, spreadsheet format such as Excel, Text format, and IEC 61850 System Specification Description format which is the formal IEC 61850 description of the utility system single line diagram. The storage files in this example are stored in a storage device with suffixes (e.g., .xml, .mdb, .xls, .txt, .ssd, etc.) to identify the format of the storage file. These storage formats are graphic compatible in that they can be converted directly to a graphical format using graphical presentation software. Preferably, the storage format herein is XML, which allows the programmer to define custom elements. The automatic conversion of the power monitoring system hierarchical data allows monitoring system layouts to be viewed in a graphical format. The automatic conversion algorithm transforms hierarchical data into a useful storage format and allows changes to the hierarchy layout to be graphically outputted to the end-user in real time.

Figure 5:
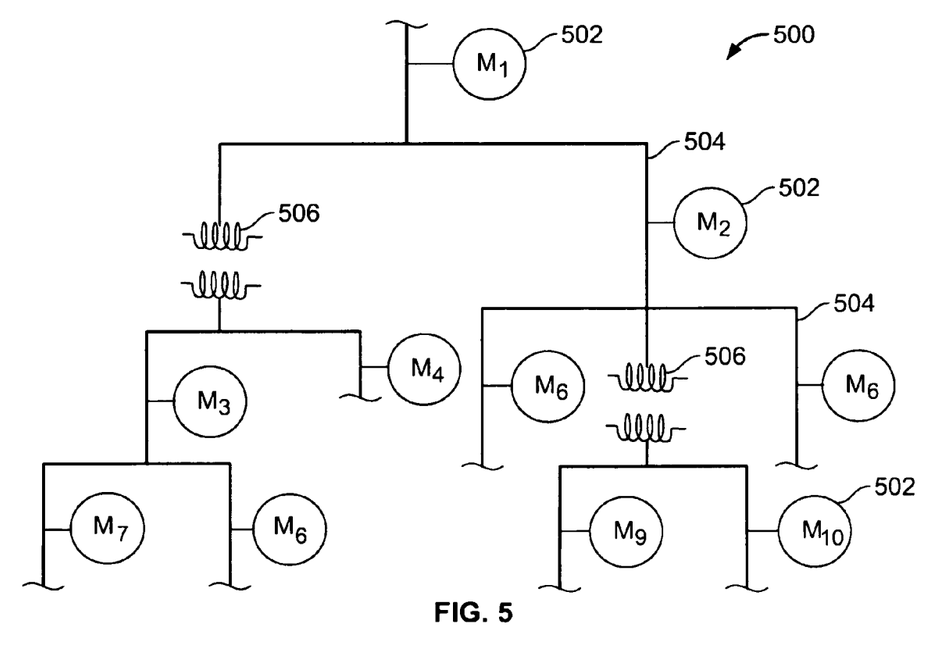
FIG. 5 is an exemplary graphical output of an example utility monitoring system layout that is based on hierarchical data formatted according to a storage format and stored in a storage file by the automated hierarchical data conversion system according to aspects of the present invention.

FIG. 5 is an exemplary display graphic 500 that may be shown on the user interface 112 in FIG. 1. The display graphic 500 shows a hierarchical layout of the elements in an exemplary utility system such as the utility system 102 based on the data obtained by the hierarchy classification system 106 in FIG. 1 and converted by the automatic conversion algorithm to a storage format for presentation on the user interface 112. The display graphic 500 includes IED graphics 502, feeder graphics 504, and component graphics 506. In this example, IED graphics 502 represent the location of different IEDs that may be utility meters or circuit monitors. The feeder graphics 504 represent the feeder branches between system components. The component graphics 506 represent various equipment or devices other than IEDs in the utility system 102 such as transformers. As will be explained below, the graphics 502, 504 and 506 are generated based on respective XML elements having different attributes.

As may be seen in FIG. 5, the end-user has a graphical perspective of the utility system and can readily ascertain which nodes or elements are directly or indirectly linked together or not linked at all.

Any of the algorithms described herein include machine readable instructions for execution by: (a) a processor, (b) a controller, and/or (c) any other suitable processing device. It will be readily understood that the system 100 in FIG. 1 includes such a suitable processing device for running the software applications 110 and the hierarchy classification system 106. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 6:
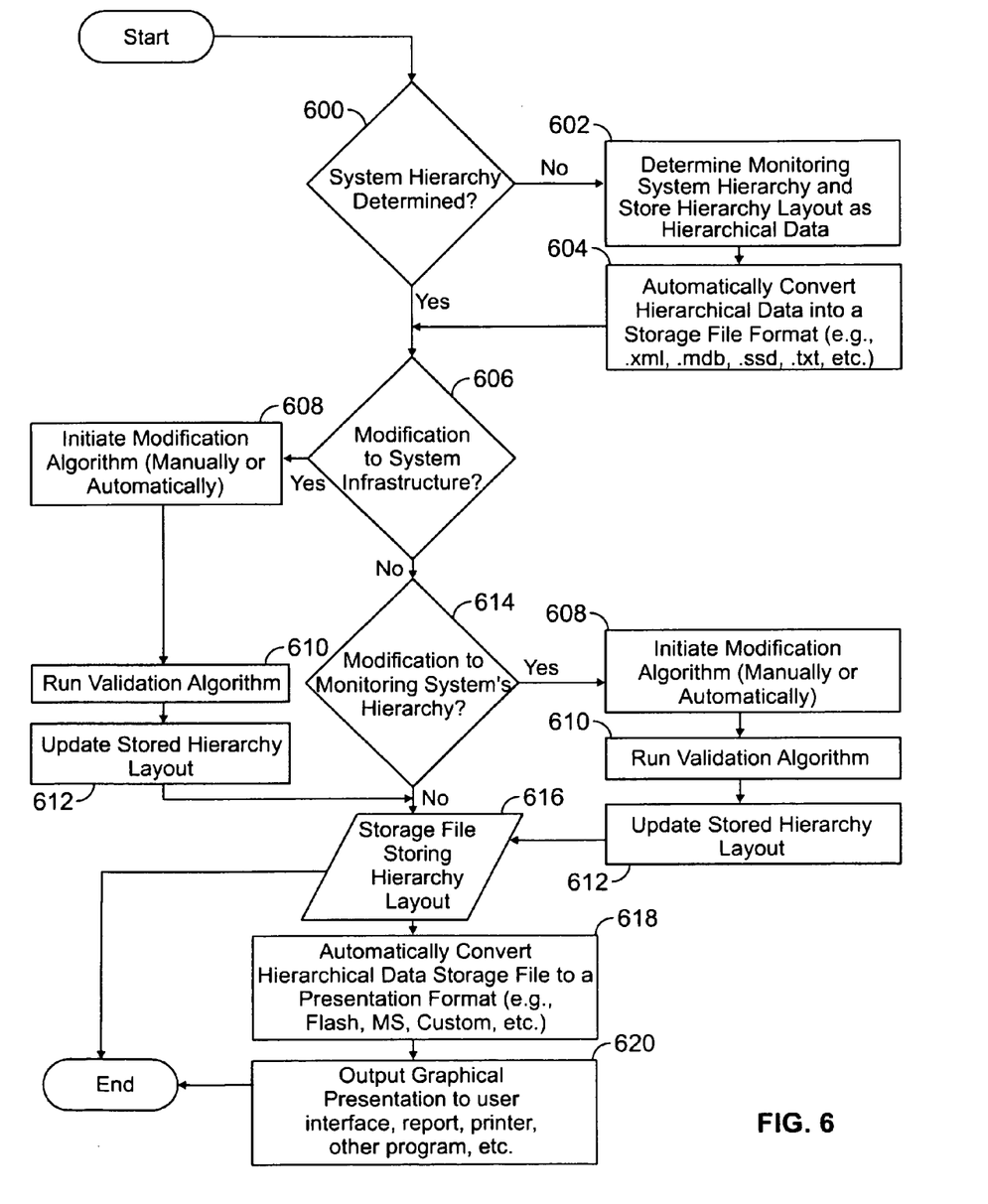
FIG. 6 is a flow chart diagram of an algorithm to convert monitoring data into a graphical output such as shown in FIG. 5.

FIG. 6 shows a flow diagram of the general automatic conversion algorithm to convert numerical utility infrastructure data into a useful storage format. The automatic determination of the utility system layout from the hierarchy classification system 106 in FIG. 1 will represent the hierarchy of the utility system in the form of numerical infrastructure data. In order to store the utility system layout so that it can later be converted into a graphical user display, the automatic conversion algorithm in FIG. 6 automatically converts the hierarchy numerical data into an external storage file format that is graphics compatible or that can be directly transformed into a graphical representation by presentation software. In this example, the storage format is extensible markup language (XML) but other graphics-compatible data formats may be used as stated above.

Once the hierarchy is stored in one of the external file storage formats mentioned above, it can be used to graphically present the utility monitoring system hierarchical layout to the user via the user interface 112 in FIG. 1. The graphics may be generated via a graphical presentation application such as Microsoft Windows Presentation Foundation (WPF), Macromedia Flash, Citect Graphics Builder, TAC Vista Graphic tools, or any other suitable graphical presentation software. This entire conversion process is automated so that end-user interaction is not required.

Returning to FIG. 6, the automatic conversion algorithm determines whether the system hierarchy has been determined (600). The system hierarchy may be determined manually or automatically by an auto-learned hierarchy algorithm. If the system hierarchy has not been determined, the algorithm runs an auto-learned hierarchy algorithm, such as that in the hierarchy classification system 106 in FIG. 1, or receives input manually from the end-user representative of the monitoring system hierarchy to determine the monitoring system hierarchy (602). The hierarchy classification system 106 generates the hierarchy data in the form of a numerical hierarchy data file. The algorithm automatically converts the resulting numerical hierarchy data into a storage file format such as XML with a conversion routine as explained further with reference to FIG. 7 below (604).

Figure 8A:
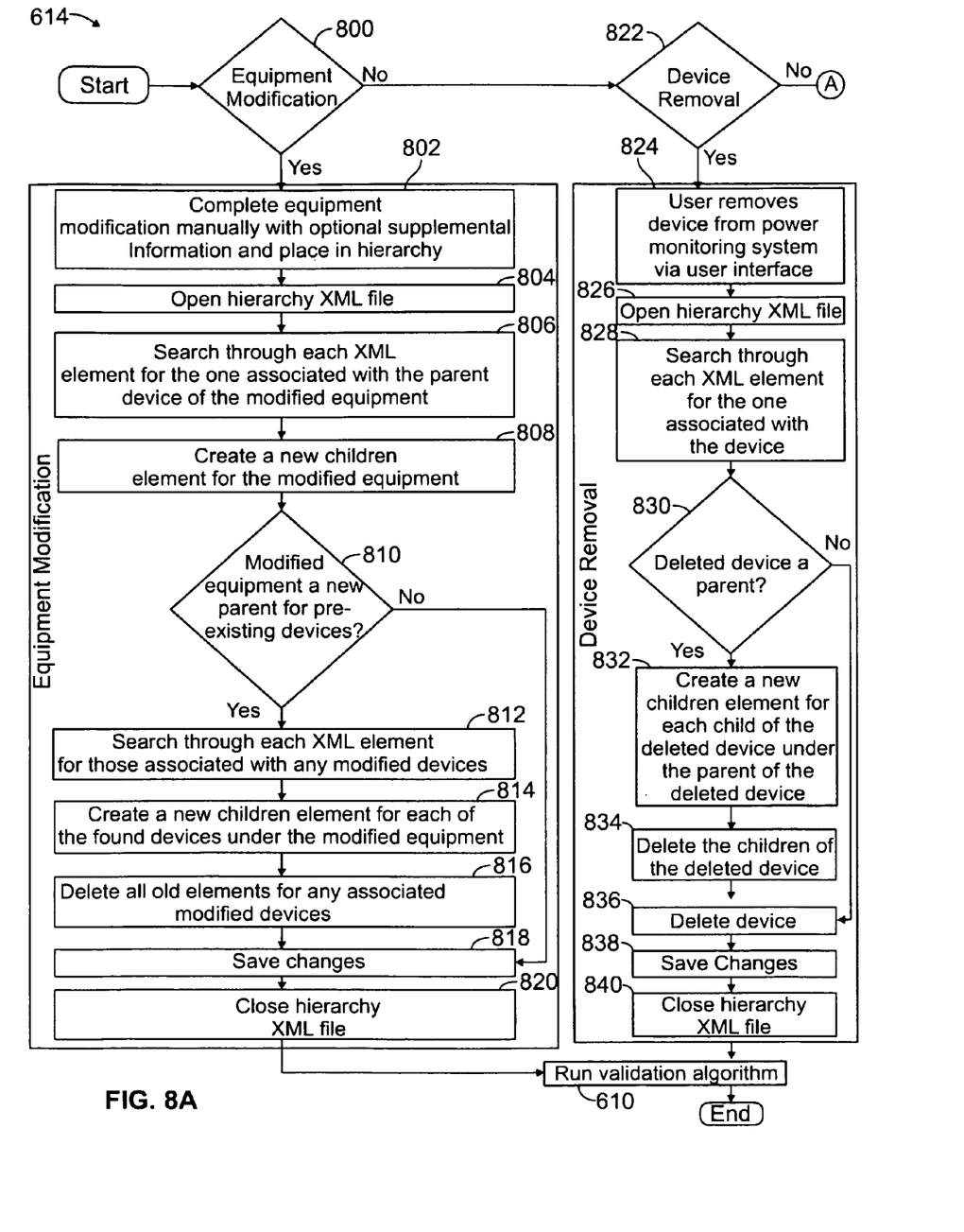
FIGS. 8A-8C are a flow chart diagram of a modification algorithm that modifies the storage file in response to equipment modification, device removal, device addition or device relocation in accordance with the algorithm in FIG. 6.

Once the hierarchy system has been determined, whether by process (602, 604) or if already known, the automatic conversion algorithm determines whether there has been a modification to the system infrastructure (e.g., the addition of a transformer, etc.) (606). If so, the automatic conversion algorithm accesses the modification module that runs the modification algorithm as will be further described below with reference to FIG. 8 (608). The modification algorithm may be initiated manually by the end-user or automatically. Once the modification has been made (either automatically or manually), the automatic conversion algorithm accesses a validation module that runs a validation algorithm that will be further described below with reference to FIG. 9 (610). The stored hierarchy layout is updated by the algorithm (612).

If the automatic conversion algorithm determines that there has not been a modification to the system infrastructure (606), the algorithm determines whether there is a modification to the monitoring system's hierarchy (614). Infrastructure changes may be determined either automatically or manually. For example, significant steady-state changes in voltages between utility monitoring devices will indicate the presence of a transformer where there may have not been one before. Examples of other infrastructure modifications may include the addition of nameplate information on a transformer that must be entered manually in most cases. Modifications are detected by any noteable addition of a device in the software. The end-user may manually place the device, or the hierarchy algorithm may run to place the device automatically. Devices that are deleted from the software will be deleted from the hierarchy accordingly. The relocation of a device is detected based on any relevant parameter such as voltage, pressure, power, imbalance, harmonic distortion, flow rate, etc. For an electrical utility type, the hierarchy is periodically checked to determine whether the Conservation of Energy principles are still being adhered to within the system. For other utility types (e.g., water, air, steam, and gas), the hierarchy is periodically checked to determine whether the Conservation of Mass and other thermodynamic principles are still being adhered to within the system. If there is a modification to the monitoring system's hierarchy, the algorithm loops to the modification algorithm (608), proceeds to run the validation algorithm (608) and automatically updates the stored hierarchy layout (612).

After the determination of modifications (606, 614), the algorithm accesses the stored hierarchy layout that is now in the storage file format and stored in the storage file 616. The algorithm automatically converts the hierarchical data formatted according to the storage format in the storage file into a graphical format using a graphic presentation application such as Microsoft Windows Presentation Foundation (WPF), Macromedia Flash, Citect Graphics Builder, TAC Vista Graphic tools, and the like (618). The resulting graphic showing the hierarchical relationship between elements in the utility monitoring system may be outputted to the user (620). In this example, the output is a display graphic similar to that in FIG. 5 that may be displayed on the user interface 112 in FIG. 1. Other outputs such as a printer, a report, utility monitoring device display, or other application program devices may be employed to output the resulting graphic.

Figure 7:
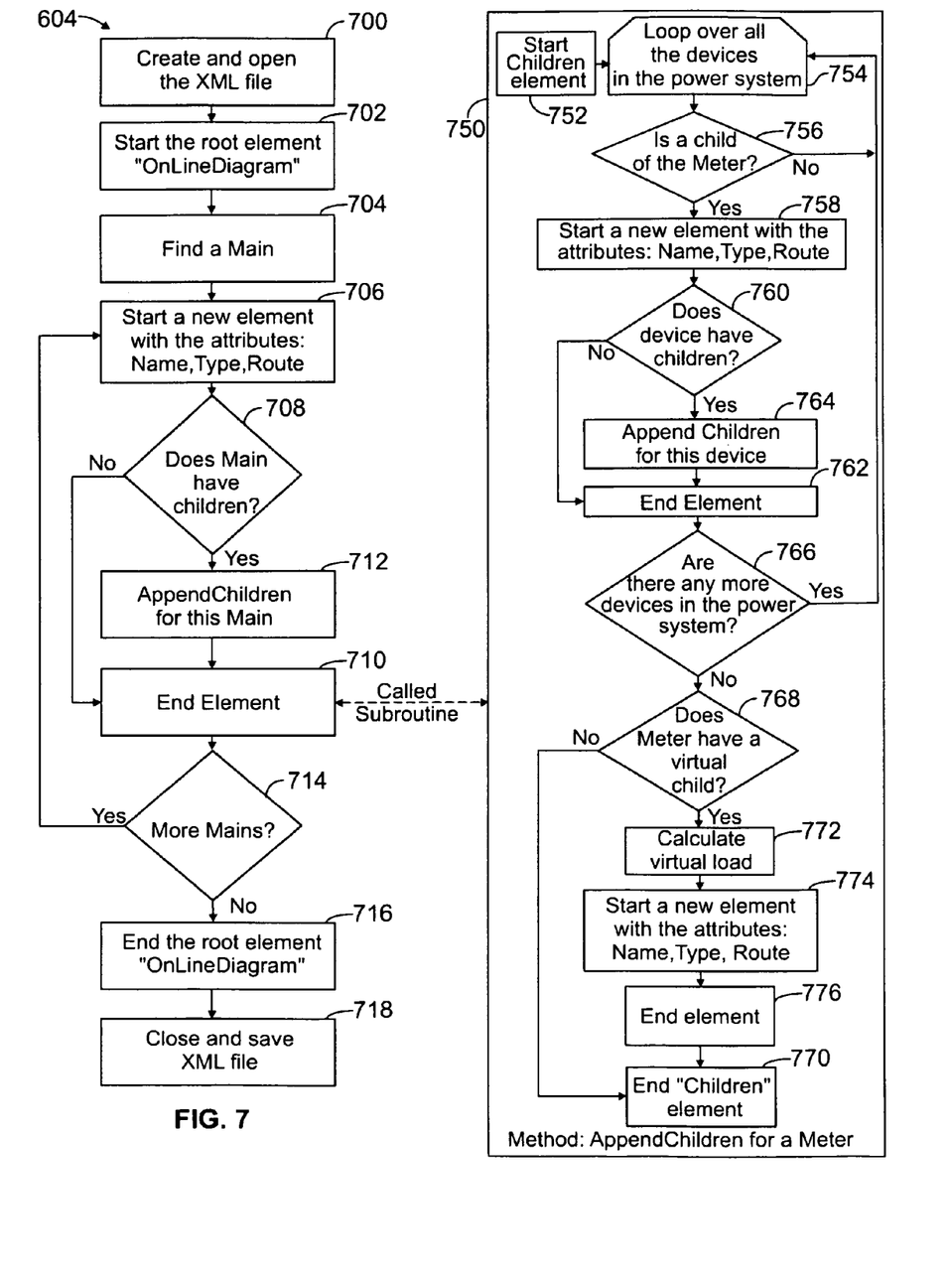
FIG. 7 is a flow chart diagram of a conversion routine to convert numerical utility infrastructure data into data formatted according to a storage data format in accordance with the algorithm in FIG. 6.

FIG. 7 illustrates the conversion routine referenced in block 604 of FIG. 6. Generally, the conversion routine 604 in FIG. 7 creates an XML storage file for the converted data. The conversion routine 604 automatically goes through all devices monitoring a "Main" in the auto-learned hierarchy of utility monitoring system one at a time and an XML "Device" element is created for each device. If the "Main" device has children, an XML "Children" element is created for the device and an XML "Device" element is created for each of its children. Recursively, all children devices for each "Device" element are added in the XML file if it has children. Of course, other XML elements may be created for the purposes of the conversion routine 604 in FIG. 7.

The conversion routine 604 creates and opens an XML storage file (700). The conversion routine 604 creates the XML root element "OneLine Diagram" (702). The conversion routine 604 accesses the hierarchy numerical data to find a monitoring device monitoring a main feeder (704). The conversion routine 604 creates a new XML element with the XML attributes of Name, Type and Route for the main feeder (706). The conversion routine 604 determines whether the main feeder has children (708). If the conversion routine 604 determines that the main feeder does not have any children (708), the conversion routine 604 ends the XML element for the main feeder (710).

If the conversion routine 604 determines that the main feeder has children, the conversion routine 604 calls an AppendChildren subroutine 750 to append children for the main feeder (712). The conversion routine ends the XML element for the main feeder (710). Once the XML element is ended, the conversion routine determines whether there are any more monitoring devices monitoring main feeders from the hierarchy numerical data (714). If there are more main feeders, the conversion routine loops back to create a new XML element (706). In this manner, all the main feeders and their respective children are converted into XML elements.

Once there are no additional main feeders, the conversion routine ends the XML root element "OneLineDiagram" (716). The conversion routine closes and saves the XML storage file (718) in the storage file 616 for access by the algorithm described in FIG. 6.

The AppendChildren subroutine 750 is called to append children to a main feeder. The subroutine 750 creates an XML "Children" element (752). The subroutine 750 loops over all monitoring devices in the utility system by reviewing the numerical infrastructure data representing the hierarchy of the utility system (754). The subroutine 750 determines whether a device under consideration is a child of the parent device (such as the main feeder or a meter) (756). If the device is not a child of the main feeder, the subroutine 750 loops back to the next device in the utility system being monitored. If the device is a child of the main feeder, the subroutine 750 creates a new XML element with the XML attributes, Name, Type, and Route (758). The subroutine determines whether the device has any children (760). If the device does not have any children, the subroutine ends the XML element (762). If the device has children, the subroutine appends children for the device (764). The subroutine 750 ends the XML element (762).

Once the XML element is ended (762), the subroutine 750 determines whether there are any more devices in the utility system (766). If there are additional devices in the utility system, the subroutine 750 loops back to examine any additional devices in the utility system (754). If there are no additional devices, the subroutine 750 determines whether the meter has a virtual load (768). If the meter does not have a virtual load, the subroutine ends the Children XML element (770). If the meter has a virtual load, the subroutine calculates the value of the virtual load (772). The subroutine 750 creates a new XML element with the attributes Name, Type and Route for the virtual load (774). The subroutine 750 then ends the XML element for the virtual child (776) and proceeds to end the Children XML element (770).

Figure 8B:
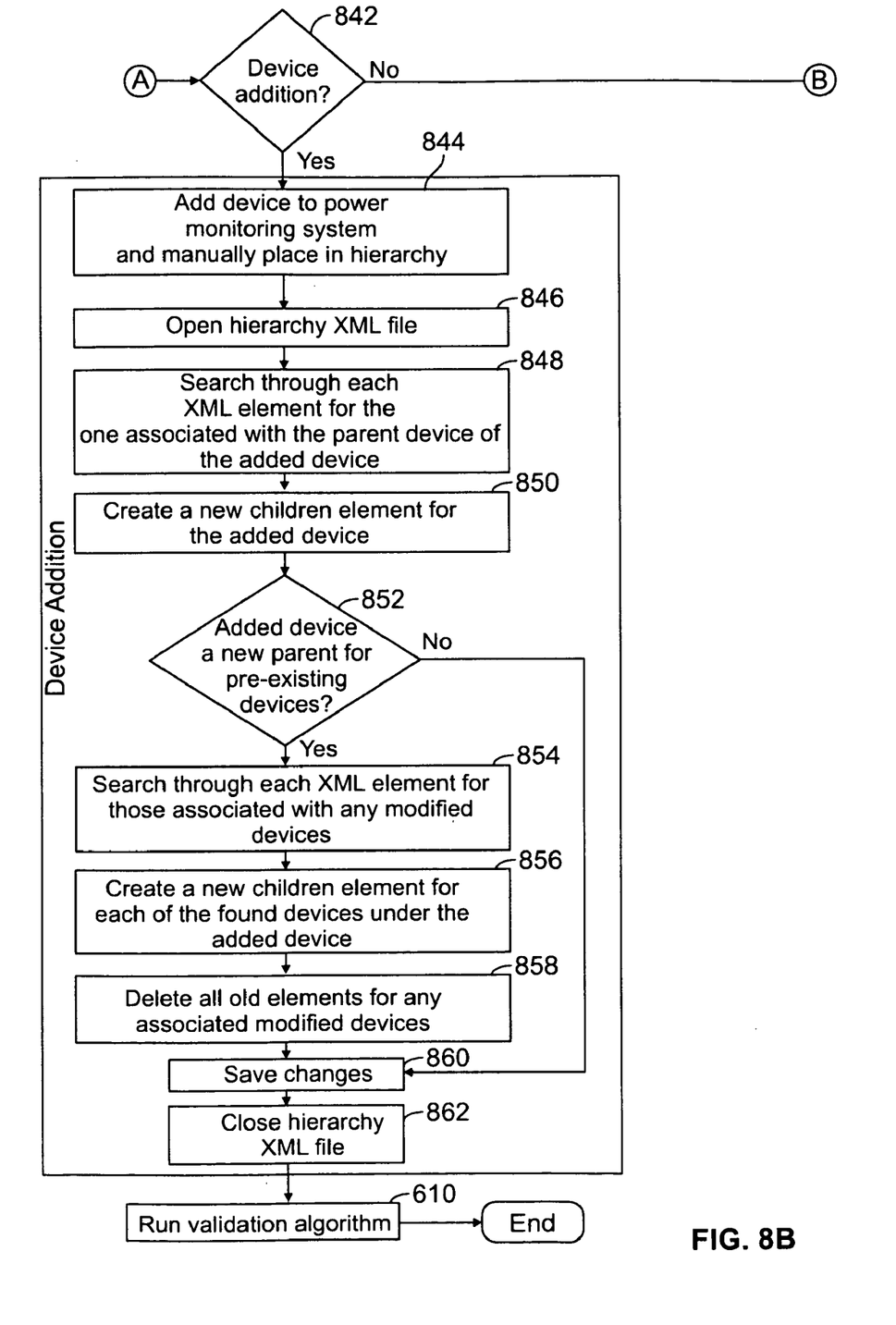
Figure 8C:
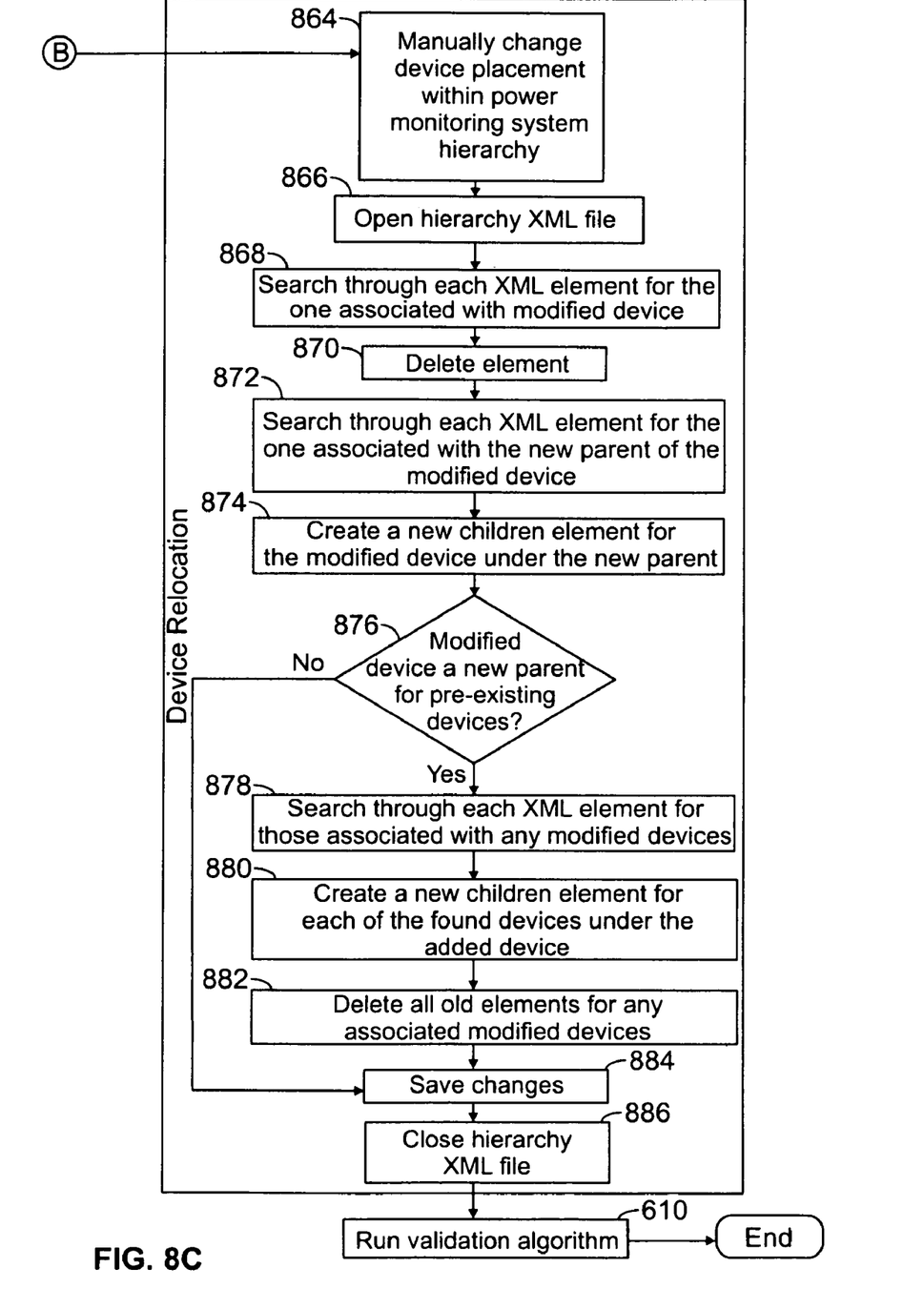

FIGS. 8A-8C are a flow diagram of the modification algorithm from block 608 in FIG. 6 that modifies the infrastructure and location of IEDs and other utility system components within a known hierarchy. Once the location of an IED is modified, the modification algorithm adjusts the XML storage file accordingly to accurately represent the respective modifications. Utility system components may include load types (e.g., motors, lighting, servers, pumps. etc.), infrastructure types (e.g., transformers, capacitors, breakers, pressure reducers, etc.), or other miscellaneous/custom types to be determined at the end-user's discretion (e.g., communications, processes, etc.). In this example, modifications may include equipment modifications, removal of devices, addition of devices or a change of the placement of devices in the utility monitoring system.

The modification algorithm first determines whether the modification is an equipment modification (800). If the modification is an equipment modification, the equipment modification is completed by prompting the end-user to supply optional supplemental information and place the equipment manually into the hierarchy (802). The modification algorithm opens the XML storage file (804). The modification algorithm searches through each XML element in the XML storage file 616 for the XML element associated with the parent device of the modified equipment (806) in the XML storage file 616. The modification algorithm then creates a new children XML element for the modified equipment (808).

The modification algorithm determines whether the modified equipment is a new parent for a pre-existing device (810). If the modified equipment is a new parent for a pre-existing device, the modification algorithm searches through each XML element in the XML storage file for those elements associated with any modified devices (812). The modification algorithm creates a new Children XML element for each of the found devices under the modified equipment (814). The modification algorithm deletes all of the old XML elements for any associated modified devices in the XML storage file 616 (816). The modification algorithm saves all the changes in the XML storage file 616 (818). If the modified equipment is not a new parent for a pre-existing device, the modification algorithm proceeds to save all the changes in the XML storage file 616 (818). After saving the changes, the modification algorithm then closes the XML storage file 616 (820). The modification algorithm terminates and the validation algorithm is initiated (610). If only optional supplemental information is added to a device or component, then that respective data is attached to the device or component without any changes to the hierarchy.

If the modification is not an equipment modification, the modification algorithm determines whether the modification is a device (IED) removal (822). If the modification is a device removal, the modification algorithm prompts the user to remove the device manually from the utility system (824). In this example, the user may remove the device via the user interface 112 in FIG. 1. As explained above, device removal may also be performed automatically based on a condition such as a lack of communication with the device over a given period of time. The modification algorithm opens the XML storage file 616 (826). The modification algorithm searches through each XML element in the XML storage file for the element associated with the deleted device (828).

Once the element associated with the deleted device is located, the modification algorithm determines whether the deleted device is a parent element (830). If the deleted device is a parent element (830), the modification algorithm creates a new Children XML element for each child of the deleted device under the parent of the deleted device (832). The modification algorithm deletes the children of the deleted device in the XML storage file 616 (834). The modification algorithm deletes the device (836). If the modification determines the deleted device is not a parent, it simply deletes the device (836).

After the device is deleted, the modification algorithm proceeds to save all the changes in the XML storage file 616 (838) and closes the file 616 (840). The modification algorithm terminates and the validation algorithm is initiated (610).

If the modification is not a device removal (822), the modification algorithm determines whether the modification is a device addition (842). If the modification is the addition of the device, the device is added to the utility monitoring system and the end-user is provided a prompt to manually place the device in the hierarchy (844). A device may also be automatically placed in the hierarchy by an algorithm. The modification algorithm opens the XML storage file 616 (846). The modification algorithm searches through each XML element in the XML storage file for the element associated with the parent device of the added device (848). The modification algorithm creates a new Children XML element for the added device (850).

The modification algorithm determines whether the added device is a new parent for a pre-existing device (852). If the added device is a new parent for a pre-existing device, the modification algorithm searches through each XML element for those associated with any modified devices (854). The modification algorithm creates a new Children XML element for each of the found devices under the added device (856). The modification algorithm deletes all of the old XML elements for any associated modified devices (858). The modification algorithm saves all the changes in the XML storage file 616 (860). If the added device is not a new parent for a pre-existing device, the modification algorithm saves all the changes in the XML storage file 616 (860). After saving the changes (860), the modification algorithm closes the XML storage file 616 (862). The modification algorithm terminates and the validation algorithm is initiated (610).

If the modification algorithm determines the modification is not the addition of a new device (842), the modification is a relocation of a device. The modification algorithm prompts the user to manually change the placement of the modified device in the utility monitoring system hierarchy (864). The placement of the modified device may also be automatically changed by reviewing utility parameters and validating conservation of energy/mass principles. The modification algorithm opens the XML storage file 616 (866). The modification algorithm searches through each XML element in the XML storage file 616 for the element associated with the modified device (868). Once the element associated with the modified device is located, it is deleted (870). The modification algorithm searches through each XML element in the XML storage file 616 for the element associated with the new parent of the modified device (872). The modification algorithm creates a new Children XML element for the modified device under the new parent (874).

The modification algorithm determines whether the modified equipment is a new parent for a pre-existing device (876). If the modified equipment is a new parent for a pre-existing device, the modification algorithm searches through each XML element for those associated with any modified devices (878). The modification algorithm creates a new Children XML element for each of the found devices under the added device (880). The modification algorithm deletes all of the old XML elements for any associated modified devices (882). The modification algorithm saves all the changes in the XML storage file 616 (884). If the modified device is not a new parent for a pre-existing device, the modification algorithm saves all the changes in the XML storage file 616 (884). After saving the changes, the modification algorithm closes the XML storage file 616 (886). The modification algorithm terminates and the validation algorithm is initiated (610).

Figure 9:
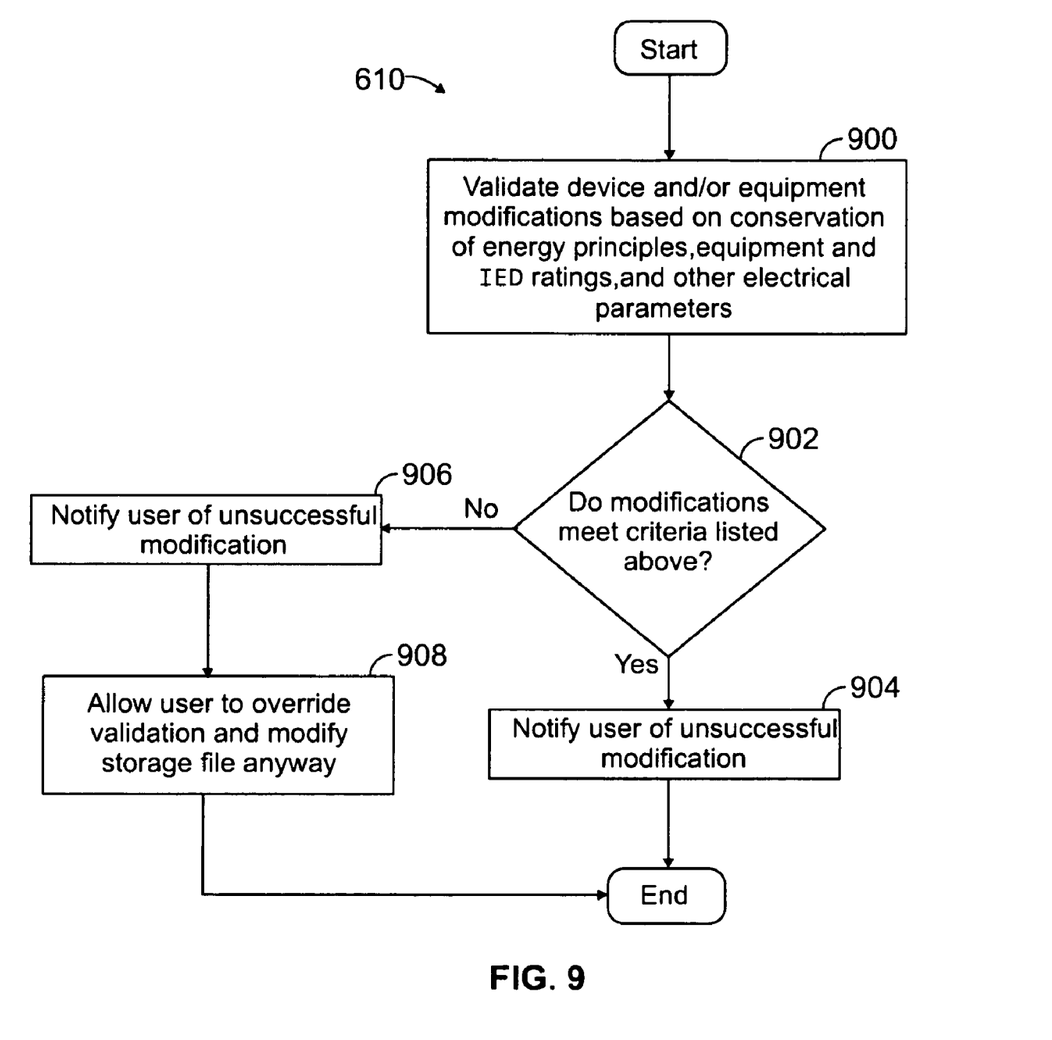
FIG. 9 is a flow chart diagram of a validation algorithm in accordance with the algorithm in FIG. 6.

FIG. 9 is a flow diagram of the validation algorithm accessed in block 610 of FIG. 6. The validation algorithm validates the modification of IEDs or other utility system components. This validation algorithm verifies that each modification adheres to the conservation of energy (or mass) principles. It also provides the end-user with the ability to override any unsuccessful validation assessments via the user interface 112.

The validation algorithm validates the device and/or equipment modifications based on conservation of energy (or mass) principles, equipment and IED ratings, and other electrical parameters (900). Of course a user may provide other criteria specific to the system for validating modifications. The validation algorithm determines whether the modifications meet the criteria listed above (902). If the modifications meet the criteria, the validation algorithm notifies the user of successful modification of the device and or/equipment and ends.

If the validation algorithm determines that the modifications do not meet the criteria, the validation algorithm notifies the user of the unsuccessful modification (906). The validation algorithm may display the criteria the modification has failed to meet to the user. The validation algorithm allows a user to override the validation and modify the XML storage file 616 with the modification despite not meeting the criteria (908).

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of converting numerical infrastructure data relating to a utility monitoring system having elements arranged in a hierarchy to a graphic compatible storage data format, the method comprising:
   automatically learning a hierarchy of a plurality of monitoring devices in a utility monitoring system;
   storing a representation of the hierarchy as numerical infrastructure data indicating a hierarchical arrangement of the monitoring devices in the hierarchy and their relationships to one another, each of the monitoring devices monitoring a characteristic of a utility of the utility monitoring system;
   obtaining the numerical infrastructure data;
   automatically converting the numerical infrastructure data relating to the elements of the utility monitoring system to the graphic compatible storage data format that, when displayed as a display graphic on a video display, presents the hierarchical layout of the monitoring devices in the hierarchy and how the monitoring devices are linked together within the hierarchy based on the numerical infrastructure data;
   storing the converted data in a storage file; and
   reading the storage file and generating a graphic display representing the hierarchy of the elements in the utility monitoring system, the monitoring devices and links between the monitoring devices being represented by graphics physically arranged on the display relative to each other representing how the monitoring devices are linked together within the hierarchy, the arrangement of the monitoring devices and links including at least one of a parent child relationship between at least two monitoring devices or a peer relationship between at least two monitoring devices.

2. The method of claim 1, wherein the graphic compatible storage data format is at least one of the group of extensible markup language (XML) format, Database format, spreadsheet format, Text format, and IEC 61850 System Specification Description format.

3. The method of claim 2, wherein the elements include a Name attribute, a Type attribute and a Route attribute.

4. The method of claim 1, wherein the graphic compatible storage data format is System Specification Description (SSD) format and each element is a parent or children element.

5. The method of claim 1, further comprising:
   receiving an indication that a modification to the hierarchy in the utility monitoring system has occurred;
   automatically modifying only graphic compatible storage format data relating to the modified element in the utility monitoring system; and
   automatically updating the storage file with the modified graphic compatible storage format data only relating to the modified element.

6. The method of claim 5, wherein the modification is at least one of a group of an equipment modification, a removal of a device, an addition of a device or a change of the placement of a device in the utility monitoring system.

7. The method of claim 5, further comprising validating the modification against predetermined criteria.

8. The method of claim 1, wherein the converting the numerical infrastructure data includes:
   establishing a root element;
   finding a main feeder among the numerical infrastructure data; and
   establishing an element relating to the main feeder.

9. The method of claim 1, wherein the converting the numerical infrastructure data further includes:
   determining if the main feeder has children; and
   recursively appending children elements to the main feeder.

10. A system converting numerical infrastructure data to graphic compatible storage data format, the system comprising:
    a hierarchy classification system that automatically learns a hierarchy of the elements in a utility monitoring system, each of the elements monitoring a characteristic of a utility of the utility monitoring system;
    a hierarchical data conversion system that stores a representation of the hierarchy as numerical infrastructure data indicating a hierarchical arrangement of the monitoring devices in the hierarchy and their relationships to one another;
    a data interface that obtains the numerical infrastructure data;
    a controller that automatically converts the numerical infrastructure data relating to the elements of the utility monitoring system to the graphic compatible storage data format that, when presented on a user interface, presents the hierarchical layout of the elements in the hierarchy and how the elements are linked together in the hierarchy based on the numerical infrastructure data, the controller further storing the converted data in a storage file;
    a storage device coupled to the controller to store the storage file; and
    a display device that displays a graphic display representing the hierarchy of the elements in the utility monitoring system, the monitoring devices and links between the monitoring devices being represented by graphics physically arranged on the display in relative to each other representing how the monitoring devices are linked together within the hierarchy, the arrangement of the monitoring devices and links including at least one of a parent child relationship between at least two monitoring devices or a peer relationship between at least two monitoring devices.

11. The system of claim 10, wherein the graphic compatible storage data format is at least one of the group of extensible markup language (XML) format, Database format, spreadsheet format, Text format, and IEC 61850 System Specification Description format.

12. The system of claim 11, wherein the elements include a Name attribute, a Type attribute and a Route attribute.

13. The system of claim 10, wherein the graphic compatible storage data format is System Specification Description (SSD) format and each element is a parent or children element.

14. The system of claim 10, further comprising a modification module accessed by the controller to:
    accept an input indicating the modification of an element in the utility monitoring system;
    automatically modify only graphic compatible storage format data relating to the modified element in the utility monitoring system; and
    automatically update the storage file with the modified graphic compatible storage format data only relating to the modified element.

15. The system of claim 14, wherein the modification is at least one of a group of an equipment modification, a removal of a device, an addition of a device or a change of the placement of a device in the utility monitoring system.

16. The system of claim 14 further comprising a validation module accessed by the controller to validate the modification against predetermined criteria.

17. A non-transitory machine readable medium having stored thereon instructions for converting numerical infrastructure data relating to a utility monitoring system having elements arranged in a hierarchy to a graphic compatible storage data format, the stored instructions comprising machine executable code, which when executed by at least one machine processor, causes the machine to:

automatically learn a hierarchy of a plurality of monitoring devices in a utility monitoring system;

storing a representation of the hierarchy as numerical infrastructure data indicating a hierarchical arrangement of the monitoring devices in the hierarchy and how the monitoring devices are linked to one another, each of the monitoring devices monitoring a characteristic of a utility of the utility monitoring system;

obtain the numerical infrastructure data;

convert the numerical infrastructure data relating to the elements of the utility monitoring system to the graphic compatible storage data format that, when presented on a user interface, presents the hierarchical layout of the monitoring devices in the hierarchy and how the monitoring devices are linked together in the hierarchy;

store the converted data in a storage file;

display graphics representing the monitoring devices and links between the monitoring devices, the graphics physically arranged to each other representing how the monitoring devices are linked together within the hierarchy, the arrangement of the monitoring devices and links including at least one of a parent child relationship between at least two monitoring devices or a peer relationship between at least two monitoring devices;

receive an indication that a modification to the hierarchy in the utility monitoring system has occurred;

automatically modify graphic compatible storage format data only relating to the modified element in the utility monitoring system in response to the indication; and automatically update the storage file with only the modified graphic compatible storage format data relating to the modified element.

18. The machine readable medium in claim 17 wherein the graphic compatible storage data format is System Specification Description (SSD) format and each element is a parent or children element.

* * * * *